(12) United States Patent
Candelori et al.

(10) Patent No.: US 10,316,698 B2
(45) Date of Patent: Jun. 11, 2019

(54) DIRT SHIELD

(71) Applicant: UNITED TECHNOLOGIES CORPORATION, Farmington, CT (US)

(72) Inventors: David J. Candelori, Glastonbury, CT (US); Brandon Spangler, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 563 days.

(21) Appl. No.: 15/161,807

(22) Filed: May 23, 2016

(65) Prior Publication Data

US 2017/0335722 A1 Nov. 23, 2017

(51) Int. Cl.
| | |
|---|---|
| *F01D 9/04* | (2006.01) |
| *F01D 11/08* | (2006.01) |
| *F01D 19/00* | (2006.01) |
| *F01D 25/00* | (2006.01) |
| *F01D 25/12* | (2006.01) |
| *F01D 25/32* | (2006.01) |

(52) U.S. Cl.
CPC .......... *F01D 25/32* (2013.01); *F01D 9/041* (2013.01); *F01D 11/08* (2013.01); *F01D 25/005* (2013.01); *F01D 25/12* (2013.01); *F01D 19/00* (2013.01); *F05D 2220/32* (2013.01); *F05D 2260/202* (2013.01); *F05D 2260/607* (2013.01); *F05D 2300/17* (2013.01); *Y02T 50/675* (2013.01)

(58) Field of Classification Search
CPC .......... F01D 25/32; F01D 9/041; F01D 11/08; F01D 25/005; F01D 25/12; F01D 19/00; F05D 2220/32; F05D 2260/202; F05D 2260/607; F05D 2300/17; Y02T 50/675
See application file for complete search history.

(56) References Cited

U.S. PATENT DOCUMENTS

| | | | | |
|---|---|---|---|---|
| 4,230,436 A | * | 10/1980 | Davison | F01D 11/24 415/1 |
| 4,721,433 A | * | 1/1988 | Piendel | F01D 25/14 415/115 |
| 8,460,760 B2 | * | 6/2013 | Raji | C23C 4/16 427/140 |
| 2013/0064647 A1 | | 3/2013 | Hashimoto | |
| 2014/0010633 A1 | | 1/2014 | Meyer | |
| 2014/0099190 A1 | | 4/2014 | Meyer | |

FOREIGN PATENT DOCUMENTS

WO 2011115880 9/2011

OTHER PUBLICATIONS

EP Search report dated Oct. 4, 2017 in EP Application No. 17162067.7.

* cited by examiner

*Primary Examiner* — Richard A Edgar
(74) *Attorney, Agent, or Firm* — Snell & Wilmer, L.L.P.

(57) ABSTRACT

A system for circumferentially distributing debris in a gas turbine engine includes a component that defines a component cooling channel that has an opening and is configured to receive a cooling airflow. The system also includes a casing at least partially enclosing the component. The system also includes a debris distribution surface positioned radially between the casing and the opening.

15 Claims, 8 Drawing Sheets

DIRT SHIELD

GOVERNMENT LICENSE RIGHTS

This disclosure was made with government support under F33657-98-D-0018, which was awarded by United States Air Force. The government has certain rights in the disclosure.

FIELD

The present disclosure is directed to a debris shield for use in a turbine section of a gas turbine engine and, more particularly, to a device for circumferentially redistributing debris from a bottom of a turbine section.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

Aircraft having gas turbine engines are used throughout the world from humid jungles in South America to sandy deserts in the Middle East. Because gas turbine engines draw air from the environment, the composition of the air may vary based on the environment. At times when a gas turbine engine is in use in an environment with debris-filled air, such as in a sandy desert, the debris may be drawn into the gas turbine engine. The majority of this debris exits the gas turbine engine along with the core airflow. However, after the gas turbine engine comes to a stop, some debris may remain internally with the air. After a period of time, this debris can settle at the bottom of the engine compartment.

In response to the gas turbine engine being initialized, cooling air from the compressor section may be channeled to the turbine section and drawn into cooling holes of the turbine vanes. When the cooling air is drawn into the cooling holes, the debris at the bottom of the engine compartment is stirred. This debris may be drawn into the cooling holes along with the cooling air. More debris may be received by cooling holes of turbine vanes oriented at the bottom of the gas turbine engine. Over time, the debris may accumulate in the cooling holes of these lower turbine vanes, causing these lower vanes to have a shorter lifespan than vanes towards the top of the gas turbine engine.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a system for circumferentially distributing debris in a gas turbine engine. The system includes a component that defines a component cooling channel that has an opening and is configured to receive a cooling airflow. The system also includes a casing at least partially enclosing the component. The system also includes a debris distribution surface positioned radially between the casing and the opening.

In any of the foregoing systems, the debris distribution surface extends for between 60 degrees and 180 degrees about a circumference of the gas turbine engine.

In any of the foregoing systems, the debris distribution surface includes an austenitic nickel-chromium-based alloy.

In any of the foregoing systems, the component includes at least one of a vane, a vane support, or a blade outer air seal (BOAS).

In any of the foregoing systems, the casing at least partially defines an upstream cooling channel configured to provide the cooling airflow to the component cooling channel.

In any of the foregoing systems, a circumferential center of the debris distribution surface is circumferentially aligned with a bottom of the gas turbine engine.

In any of the foregoing systems, the debris distribution surface is a circumferentially continuous second portion of a vane support.

Also described is a system for circumferentially distributing debris in a gas turbine engine. The system includes a plurality of vanes each having a vane cooling channel for receiving a cooling airflow. The system also includes a casing at least partially enclosing the plurality of vanes. The system also includes a vane support positioned circumferentially about the plurality of vanes and radially between the plurality of vanes and the casing and having a first portion that defines a plurality of component cooling channels and a circumferentially continuous second portion that extends for at least 30 degrees about a circumference of the vane support.

In any of the foregoing systems, the circumferentially continuous second portion extends for between 60 degrees and 180 degrees about the circumference of the vane support.

In any of the foregoing systems, the circumferentially continuous second portion defines at least a second component cooling channel that has been at least one of covered or filled in.

In any of the foregoing systems, the casing at least partially defines an upstream cooling channel configured to provide the cooling airflow to the vane cooling channel.

In any of the foregoing systems, a center of the circumferentially continuous second portion is aligned with a bottom of the gas turbine engine.

In any of the foregoing systems, each of the plurality of component cooling channels has a same diameter.

In any of the foregoing systems, a first diameter of a first component cooling channel of the plurality of component cooling channels is greater than a second diameter of a second component cooling channel of the plurality of component cooling channels, and the first component cooling channel is closer to the circumferentially continuous second portion than the second component cooling channel.

In any of the foregoing systems, each of the plurality of component cooling channels between the first component cooling channel and the second component cooling channel has a diameter that increases from the first component cooling channel to the second component cooling channel.

In any of the foregoing systems, a first component cooling channel and a second component cooling channel of the plurality of component cooling channels have a first diameter and a third component cooling channel and a fourth component cooling channel of the plurality of component cooling channels have a second diameter that is less than the first diameter, and the third component cooling channel and the fourth component cooling channel are each farther from the circumferentially continuous second portion than the first component cooling channel and the second component cooling channel.

Also described is a system for circumferentially distributing debris in a gas turbine engine. The system includes a component that defines a component cooling channel that has an opening and is configured to receive a cooling airflow. The system also includes a local turbine cooling air (TCA) pipe having a mouth configured to provide the cooling airflow to the component cooling channel. The system also includes a debris distribution surface circumferentially aligned with the mouth of the TCA pipe and configured to distribute at least some debris flowing through the TCA pipe away from the component cooling channel.

In any of the foregoing systems, the debris distribution surface includes an austenitic nickel-chromium-based alloy.

In any of the foregoing systems, the component includes at least one of a vane, a vane support, or a blade outer air seal (BOAS).

In any of the foregoing systems, wherein the debris distribution surface is a circumferentially continuous second portion of the vane support.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned along the longitudinal axis of the gas turbine at a greater distance in the aft or forward direction away from the longitudinal center of the gas turbine than the second component. A first component that is "axially inward" of a second component means that the first component is positioned along the longitudinal axis of the gas turbine closer to the longitudinal center of the gas turbine than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. An A-R-C axis is shown throughout the drawings to illustrate the axial, radial and circumferential directions.

Figure 1:
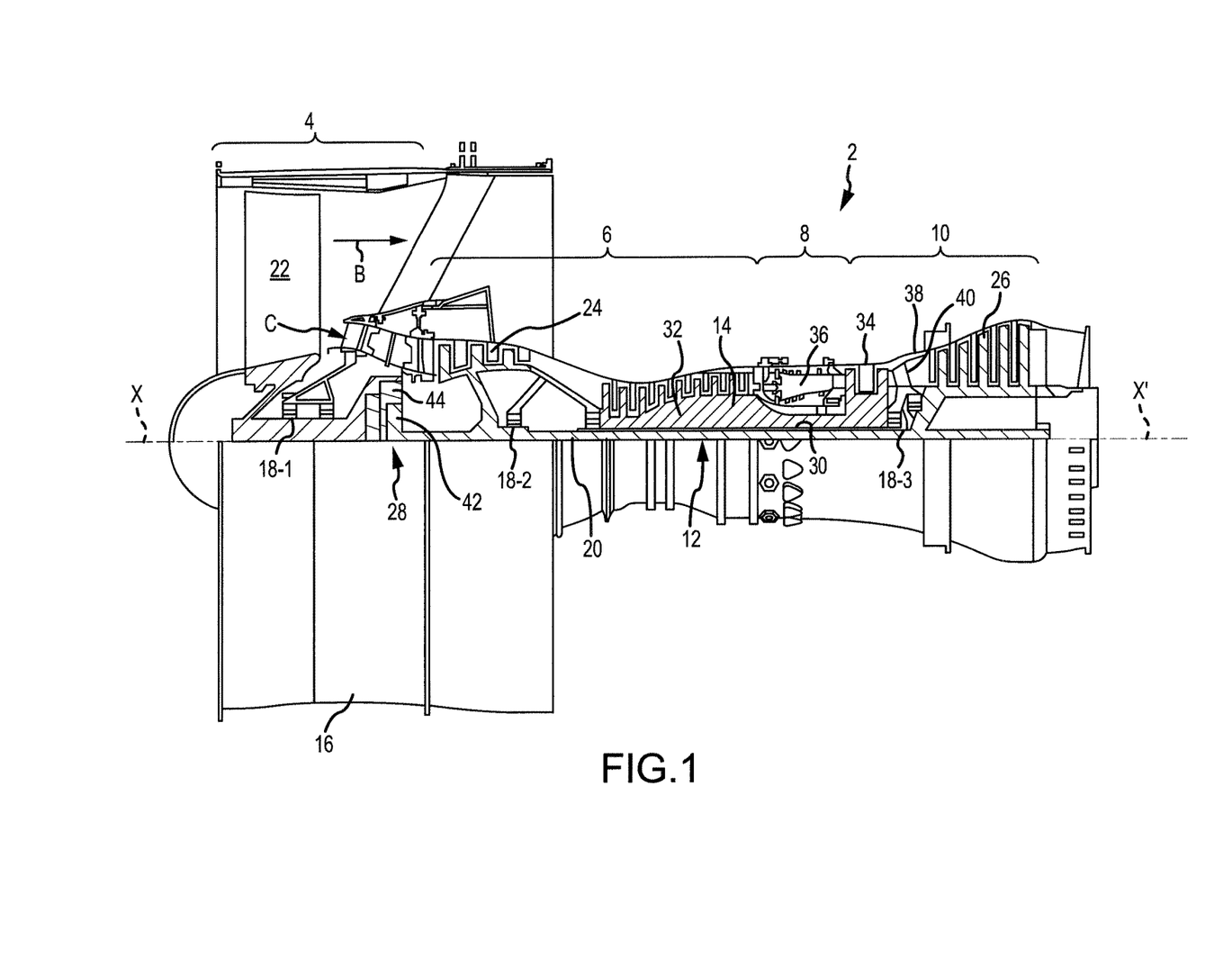
FIG. 1 is a schematic cross-section of a gas turbine engine, in accordance with various embodiments.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path b while compressor section 6 can drive air along a core flow-path c for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a second turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., first turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly greater than that of the low pressure compressor section 24, and the low pressure turbine section 26 may have a pressure ratio that is greater than about 5:1. The pressure ratio of low pressure turbine section 26 may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400 degrees Fahrenheit (1400° F., approximately 760° C.) or more, and operating conditions in combustor 36 may be higher.

In various embodiments, combustor section 8 may comprise one or more combustor 36. As mentioned, the core airflow c may be compressed, then mixed with fuel and ignited in the combustor 36 to produce high speed exhaust gases.

Figure 2:
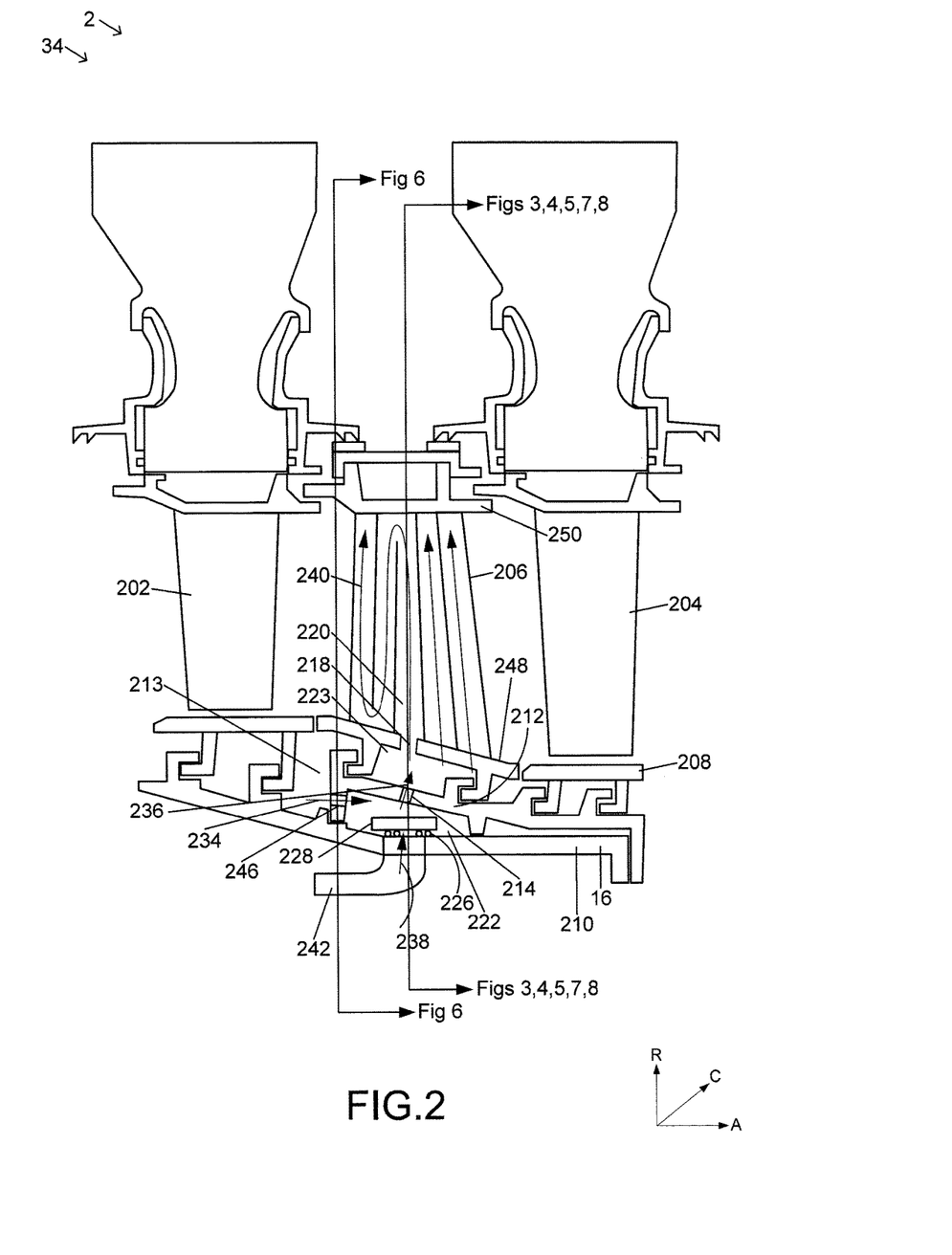
FIG. 2 is a view of a portion of a turbine section of the gas turbine engine of FIG. 1, in accordance with various embodiments.

Turning to FIG. 2, a portion of high pressure turbine section 34 is shown. High pressure turbine section 34 includes a first blade 202, a second blade 204, and a vane 206 positioned axially between first blade 202 and second blade 204. In response to the core airflow being received by high pressure turbine section 34, the airflow causes first blade 202 and second blade 204 to rotate, thus generating torque. Air flowing past first blade 202 is received by vane 206 which turns the airflow towards second blade 204.

Static structure 16 may include one or more casing 210. Casing 210 is fixed relative to axis of rotation X-X'. A blade outer air seal (BOAS) 208 is coupled to casing 210. A vane support 212 may also be in contact with, or coupled to, casing 210. Vane 206 may be coupled to vane support 212 via a vane outer diameter platform 248. Vane 206 may be coupled to a vane inner diameter platform 250 at a radially inward edge of vane 206.

In operation, high pressure turbine section 34 may be exposed to relatively high pressures and temperatures. In that regard, it is desirable for components of high pressure turbine section 34 to be cooled via cooling air. As shown by arrows 234, 236, cooling airflow may flow via an upstream cooling channel 213 to a component cooling channel 214 defined by vane support 212.

In various embodiments, an upstream cooling channel can include any channel upstream of a component cooling channel through which a cooling airflow may travel. A first channel is "upstream" from a second channel where fluid flows through the first channel before flowing through the second channel during normal operation.

In various embodiments, high pressure turbine section 34 may also include a local turbine cooling air (TCA) pipe 242. TCA pipe 242 may receive a cooling airflow from another portion of aircraft 2, such as a compressor section. The cooling airflow may flow into support cavity 222, defined between casing 210 and vane support 212, as shown by arrow 238, where it may be received by component cooling channel 214.

The cooling airflow may then flow through vane support 212 and be received within vane outer diameter cavity 223, defined between the vane outer diameter platform 248 and vane support 212. From vane outer diameter cavity 223, the cooling airflow may be received by one or more vane cooling aperture 218 of vane 206. Vane cooling aperture 218 may be in fluid communication with a vane cooling channel 220 that may flow through a larger portion of vane 206. The cooling airflow may flow throughout vane 206 as shown by arrow 240, thus reducing a temperature of vane 206.

In various embodiments, BOAS 208 may also define a component cooling channel. In that regard, reference to a component cooling channel of a component may refer to component cooling channel 214 of vane support 212, a cooling channel of BOAS 208 and/or vane cooling aperture 218 of vane 206.

In various embodiments, a cooling airflow may enter support cavity 222 via a support rail inlet 246 defined by vane support 212. A support rail inlet may be placed axially aft and/or axially forward of support cavity 222.

In various situations and referring to FIGS. 1 and 2, debris may occasionally enter gas turbine engine 2 via intake air. The majority of debris that enters gas turbine engine 2 bypasses the engine core via bypass flow-path b or flows through core flow-path c and exits gas turbine engine 2. In various embodiments, however, debris may remain within gas turbine engine 2 after gas turbine engine 2 has been turned off. After a period of time, this debris may settle at a bottom of gas turbine engine 2. Where used in this context, bottom refers to the part of gas turbine engine 2 that is nearest to the ground when gas turbine engine 2 is at rest.

Debris 226 may settle against the bottom of casing 210 (i.e., the portion of casing 210 associated with the negative-R direction). In response to gas turbine engine 2 being started, debris 226 may become unsettled and mix with air in the cooling airflow. Debris 226 may be received by vane cooling apertures of vanes within high pressure turbine section 34. The majority of debris 226 that becomes unsettled upon startup of gas turbine engine 2 may be received by vane cooling apertures of vanes nearest the bottom of gas turbine engine 2, such as vane cooling aperture 218 of vane 206. This may cause vanes towards the bottom of gas turbine engine 2 to have a shorter lifespan than vanes farther from the bottom of gas turbine engine 2.

Debris that is evenly distributed about the circumference of turbine section 34 will not shorten the lifespan of any particular vanes relative to other vanes. In order to distribute the debris, turbine section 34 includes a debris distribution surface 228. Debris distribution surface 228 is positioned between component cooling channel 214 and casing 210 and extends for a distance around the circumference of gas turbine engine 34. Debris distribution surface 228 may be axially aligned with component cooling channel 214. In various embodiments, debris distribution surface 228 may include a plate or other structure that provides a surface aligned with component cooling channel 214.

In response to gas turbine engine 2 being initialized, cooling airflow stirs debris 226. Instead of debris 226 being drawn into component cooling channel 214, debris distribution surface 228 causes debris 226 to be distributed about the circumference of high pressure turbine section 34.

Figure 3:
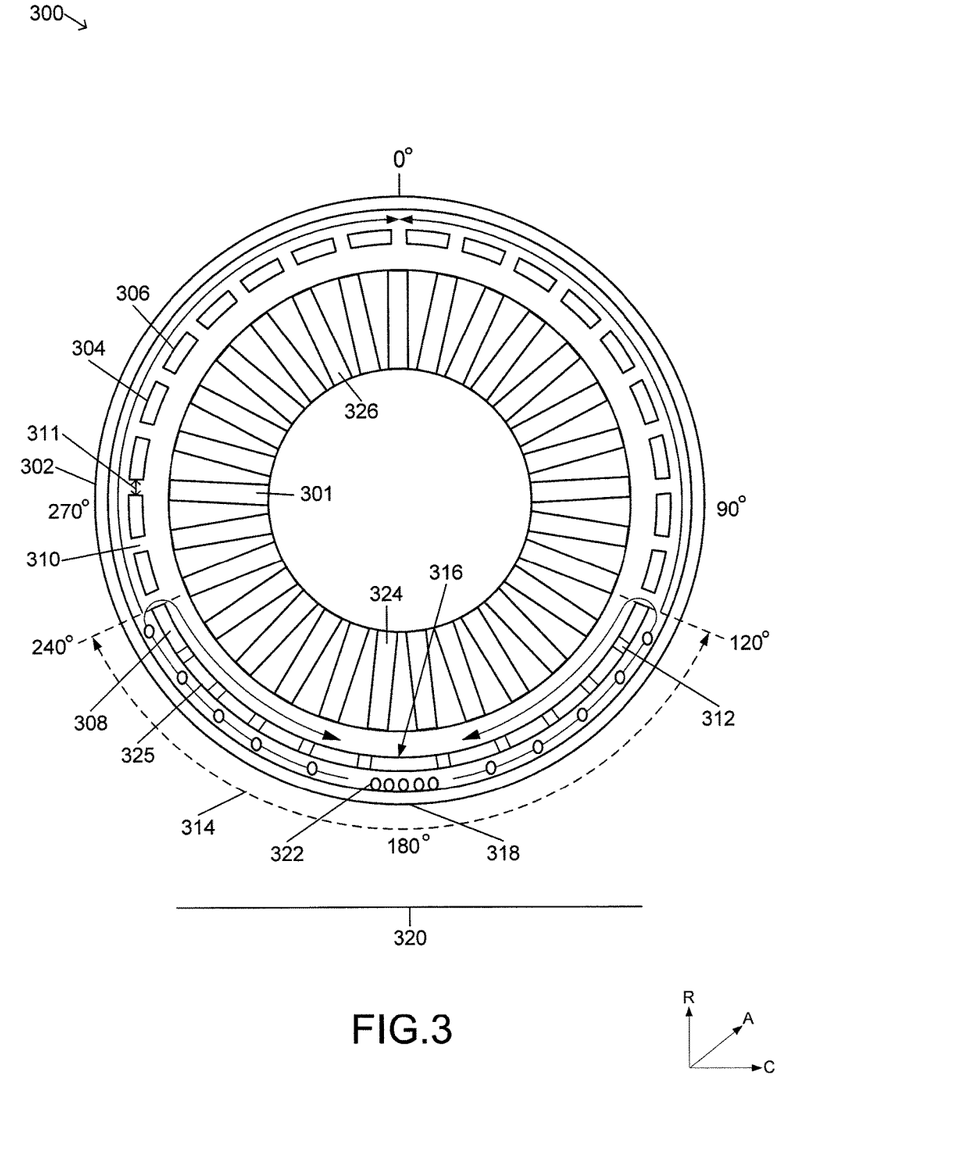
FIG. 3 is an axial view of a turbine section including a vane support having a first portion that defines component cooling channels and a circumferentially continuous second portion, in accordance with various embodiments.
Figure 4:
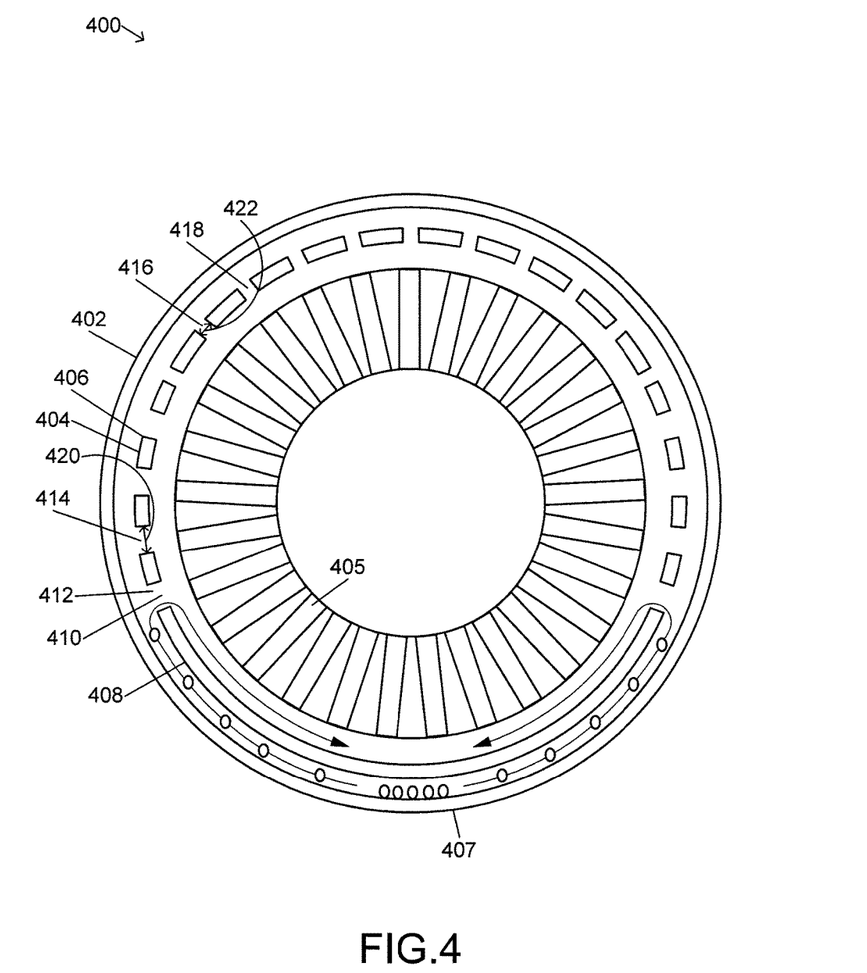
FIG. 4 is an axial view of a turbine section including a vane support having a first portion that defines component cooling channels having at least two different diameters and a circumferentially continuous second portion, in accordance with various embodiments.
Figure 5:
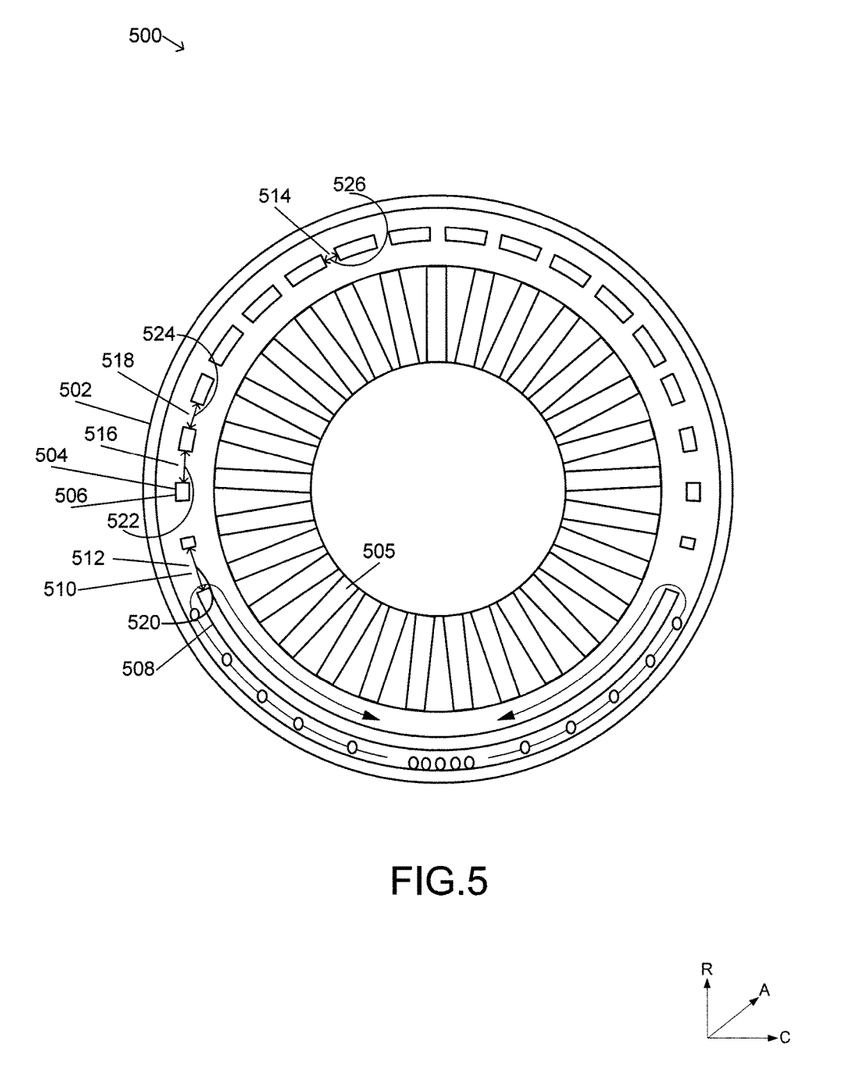
FIG. 5 is an axial view of a turbine section including a vane support having a first portion that defines component cooling channels each of a differing diameter and a circumferentially continuous second portion, in accordance with various embodiments.

In various embodiments, debris distribution surface 228 may be placed adjacent component cooling channel 214. In that regard, no debris may be received by vane outer diameter cavity 223 via component cooling channel 214. Thus, cooling air must flow circumferentially around via support cavity 222 and be received at another circumferential location via another component cooling channel and flow circumferentially back around to vanes 206 that are circumferentially aligned with debris distribution surface 228. In various embodiments, a portion of a vane support that is axially aligned with a vane may not define any component cooling channel (as shown in FIGS. 3-5). In that regard, that portion of the vane support may be referred to as a debris distribution surface.

In various embodiments, turbine section 34 may include one or more TCA pipe 242. TCA pipe 242 may or may not be positioned at a bottom of turbine section 34. During normal operation of gas turbine engine 2, air, including debris, may flow through TCA pipe 242. This debris may be received by component cooling channels 214, and thus vanes 206, that are circumferentially aligned with TCA pipe 242. Over time, debris received via TCA pipe 242 may shorten the lifespan of vane 206 relative to other vanes of high pressure turbine section 34.

Debris distribution plate 228 may be circumferentially aligned with TCA pipe 242. Debris flowing through TCA pipe 242 reaches debris distribution surface 228 prior to being received by component cooling channel 214. Debris distribution surface 228 causes this debris to be distributed circumferentially about high pressure turbine section 34. Thus, debris distribution surface 228 may increase the lifespan of vanes 206 that are circumferentially aligned with the TCA pipe 242 by reducing the amount of debris directly received by vane cooling channel 220 via component cooling channel 214.

Because debris distribution surface 228 is used in high pressure turbine section 34, it may be subjected to relatively high temperatures. Thus, it should include material capable of withstanding these relatively high temperatures. For example, debris distribution surface may be made from an austenitic nickel-chromium-based alloy such as that sold under the trademark Inconel® which is available from Special Metals Corporation of New Hartford, N.Y., USA, or other materials capable of withstanding the extreme pressures and temperatures experienced in high pressure turbine section 34.

In various embodiments, debris distribution surface 228 may be used in other sections of gas turbine engine 2. With brief reference to FIG. 1, a debris distribution surface may be used in low pressure turbine section 26, compressor section 6 or combustor section 8. In that regard, the material of a particular debris distribution surface may be selected based on the relative pressures and temperatures within the environment of the particular debris distribution surface.

Turning now to FIG. 3, an axial view of another turbine section 300 illustrates the circumferential positioning of a plurality of vanes 301, a casing 302, and a vane support 304. Vane support 304 includes a first portion 306 that defines a plurality of component cooling channels 310 and a circumferentially continuous second portion 308. Each of the plurality of component cooling channels 310 may have a diameter 311 that is substantially the same (i.e., designed to be the same while allowing for fault tolerance).

In various embodiments, vane support 304 may be provided as a single annular unit and, in various embodiments, vane support 304 may be provided as a plurality of units placed together in an annular fashion.

Circumferentially continuous second portion 308 includes at least one continuous circumferential surface 325. Stated differently, circumferentially continuous second portion 308 does not include any holes or apertures extending in the radial direction. In that regard, air may not flow through circumferentially continuous second portion 308 towards a vane 324. In various embodiments, circumferentially continuous second portion 308 may be defined as a debris distribution surface.

In various embodiments, circumferentially continuous second portion may be manufactured as a continuous component. Stated differently, circumferentially continuous second portion 308 may be manufactured without any radial apertures. In various embodiments, circumferentially continuous second portion 308 may include component cooling channels 312 that may have either been filled or covered. For example, component cooling channels 312 of circumferentially continuous second portion 308 may have been filled with a material in order to reduce or eliminate airflow therethrough. As another example, a debris distribution surface 228 may be positioned flush against component cooling channels 312 to reduce or eliminate airflow therethrough.

Circumferentially continuous second portion 308 may extend for a circumferential distance 314. Circumferential distance 314 may be between 30 degrees (30°) and 180° about the circumference of turbine section 300. In various embodiments, circumferential distance may be between 60° and 180°. In various embodiments, circumferential distance 314 may be between 90° and 150°. In various embodiments, circumferential distance 314 may be about 120°. Where used in this context, about refers to the stated value plus or minus 15% of the stated value.

In various embodiments, a circumferential center 316 of circumferentially continuous second portion 308 may be circumferentially aligned with a bottom 318 of turbine section 300. Bottom 318 of turbine section 300 corresponds to a circumferential location about turbine section 300 that is nearest to a ground surface 320 when turbine section 300 is at rest.

By aligning circumferential center 316 with bottom 318 of turbine section 300, circumferentially continuous second portion 308 is best suited to distribute the debris 322 about the circumference of turbine section 300. In that regard, in response to turbine section 300 being initialized, debris 322 may be stirred by a cooling airflow. Because circumferentially continuous second portion 308 does not include radial apertures, some debris 322 may flow circumferentially around circumferentially continuous second portion 308. Accordingly, a portion of debris 322 may be distributed between one or more vanes 326 towards a top of turbine section 300 and one or more vanes towards bottom of turbine section 300 and, thus, less debris is received by a vane 324 near the bottom 318.

Turning now to FIG. 4, an axial view of another turbine section 400 is shown. Turbine section 400 includes a casing 402, a vane support 404 and a plurality of vanes 405. A first portion 406 of vane support 404 has a plurality of component cooling channels 410, some of which may have different diameters.

Vane support 404 includes a first portion 406 that defines radially oriented component cooling channels 410 and a circumferentially continuous second portion 408 that does not allow radial airflow therethrough. First portion 406 includes a first component cooling channel 412 and a second component cooling channel 414. First portion 406 also includes a third component cooling channel 416 and a fourth component cooling channel 418.

First component cooling channel 412 and second component cooling channel 414 are circumferentially closer to circumferentially continuous second portion 408 than third component cooling channel 416 and fourth component cooling channel 418. First component cooling channel 412 and second component cooling channel 414 each have a first diameter 420 that is substantially the same. Third component cooling channel 416 and fourth component cooling channel 418 each have a second diameter 422 that is substantially the same. First diameter 420 is greater than second diameter 422. Accordingly, more air may flow radially inward via a first component cooling channel 412 and second component cooling channel 414 than through third component cooling channel 416 and fourth component cooling channel 418.

Because component cooling channels 410 have greater diameters near circumferentially continuous second portion 408, an amount of airflow that may reach vanes 405 towards a bottom 407 of turbine section 400 is greater than if all component cooling channels 410 had the same radius. Thus, and with brief reference to FIGS. 3 and 4, turbine section 400 may provide a more even distribution of airflow than turbine section 300.

Turning to FIG. 5, an axial view of another turbine section 500 is shown. Turbine section 500 includes a casing 502, a vane support 504 and a plurality of vanes 505. Vane support 504 includes a first portion 506 and a circumferentially continuous second portion 508. First portion 506 defines a plurality of component cooling channels 510. For example, first portion 506 defines a first component cooling channel 512, a second component cooling channel 514, a third component cooling channel 516 and fourth component cooling channel 518.

First component cooling channel 512 has a first diameter 520. Second component cooling channel 514 has a second diameter 526. First diameter 520 is greater than second diameter 526. Third component cooling channel 516 is positioned circumferentially between first component cooling channel 512 and second component cooling channel 514. Third component cooling channel 516 has a third diameter 522 that is less than first diameter 520 and greater than second diameter 526. Fourth component cooling channel 518 is positioned circumferentially between third component cooling channel 516 and second component cooling channel 514. Fourth component cooling channel 518 has a fourth diameter 524 that is less than third diameter 522 and greater than second diameter 526.

First component cooling channel 512 is circumferentially closer to circumferentially continuous second portion 508 than third component cooling channel 516. Third component cooling channel 516 is circumferentially closer to circumferentially continuous second portion 508 than fourth component cooling channel 518. Fourth component cooling channel 518 is circumferentially closer to circumferentially continuous second portion 508 than second component cooling channel 514. Thus, diameters of component cooling channels 510 that are circumferentially closer to circumferentially continuous second portion 508 are greater than diameters of component cooling channels 510 that are circumferentially farther from circumferentially continuous second portion 508.

This variance in diameter of component cooling channels 510 provides a more even distribution of cooling airflow about the circumference of turbine section 500 than if the diameter of each of the component cooling channels were the same.

Figure 6:
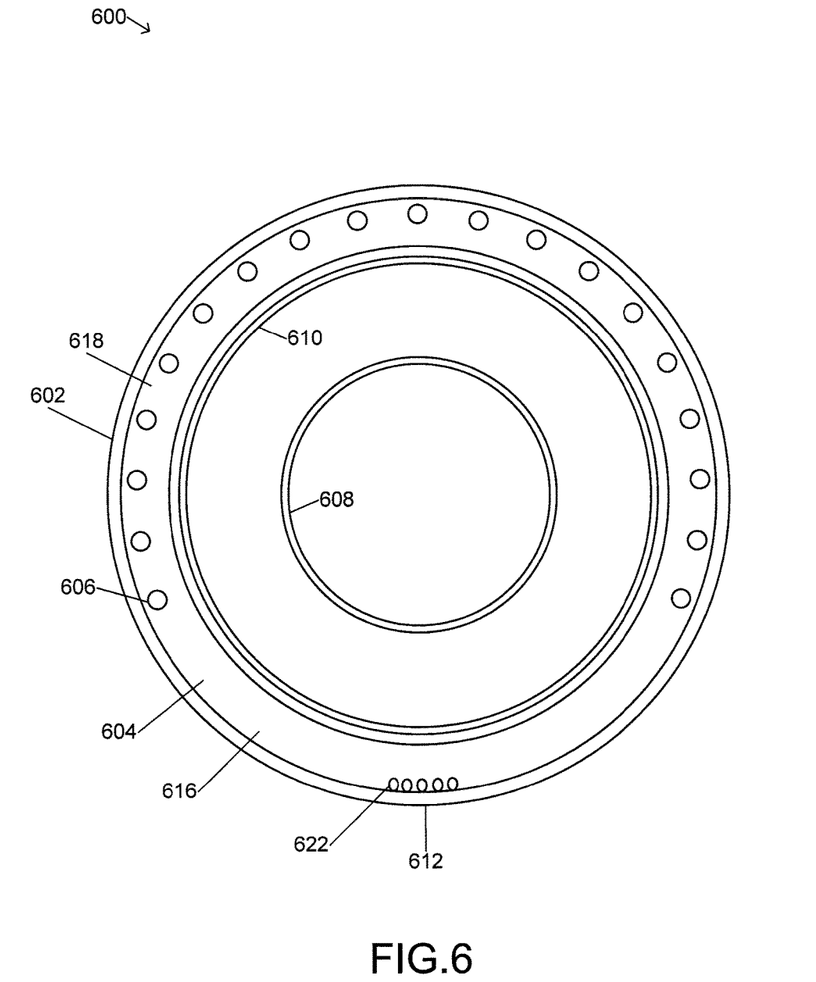
FIG. 6 is an axial view of a turbine section including a vane support having a first portion that defines support rail inlets and an axially continuous second portion, in accordance with various embodiments.

Turning now to FIG. 6, an axial view of another turbine section 600 is shown. The view shown in FIG. 6 is taken along a slice of turbine section 600 axially aligned with vane support rail inlets 246.

Turbine section 600 includes a casing 602, a vane support 604, a vane inner diameter platform 608, and a vane outer diameter platform 610. Vane support 604 includes a first portion 618 that defines a plurality of support rail inlets 606 and a circumferentially continuous second portion 616 that does not define support rail inlets. In that regard, a cooling airflow may flow axially through support rail inlets 606 to reach a support cavity of turbine section 600. Thus, the cooling airflow that flows through support rail inlets 606 may be received by a component cooling channel of vane support 604 and flow radially inward therethrough towards a vane cooling aperture of one or more vanes.

In various embodiments, circumferentially continuous second portion 616 does not define any axially oriented apertures. In various embodiments, circumferentially continuous second portion 616 may have been manufactured without axially oriented apertures. In various embodiments, axially oriented apertures, such as support rail inlets, of circumferentially continuous second portion 616 may be filled with material or covered in order to reduce or prevent airflow therethrough. In various embodiments, circumferentially continuous second portion 616 may be referred to as a debris distribution surface 228.

Air may not flow axially through circumferentially continuous second portion 616. Rather, air may flow circumferentially around vane support 604 and be received by support rail inlets 606 of first portion 618. In that regard, debris 622 at a bottom 612 of turbine section 600 may be more evenly distributed about the circumference of turbine section 600 as it cannot be drawn axially through circumferentially continuous second portion 616. In various embodiments, circumferentially continuous second portion 616 may be combined with one or more of circumferentially continuous second portions 308, 408, 508 of FIGS. 3, 4 and 5.

Figure 7:
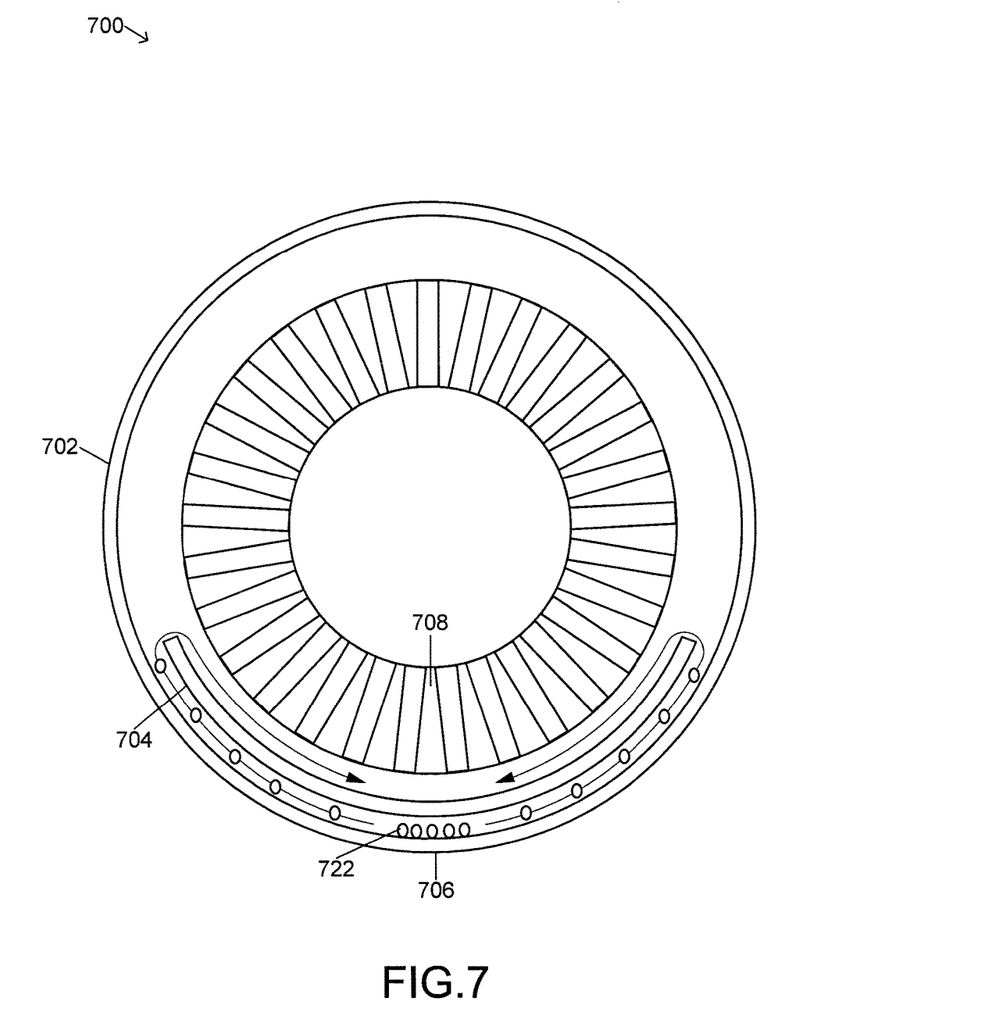
FIG. 7 is an axial view of a turbine section including a debris distribution surface, in accordance with various embodiments.

Turning now to FIG. 7, an axial view of another turbine section 700 is shown. In turbine section 700, a plurality of vanes 708 are coupled to a casing 702 without a vane support. Turbine section 700 includes a debris distribution surface 704 positioned radially between vanes 708 and casing 702. In various embodiments, debris distribution surface 704 may be circumferentially centered about a bottom 706 of turbine section 700. Debris distribution surface 704 does not define apertures in the radial direction and, thus, debris 722 from the bottom 706 must flow around debris distribution surface 704 to reach any of the vanes 708.

Figure 8:
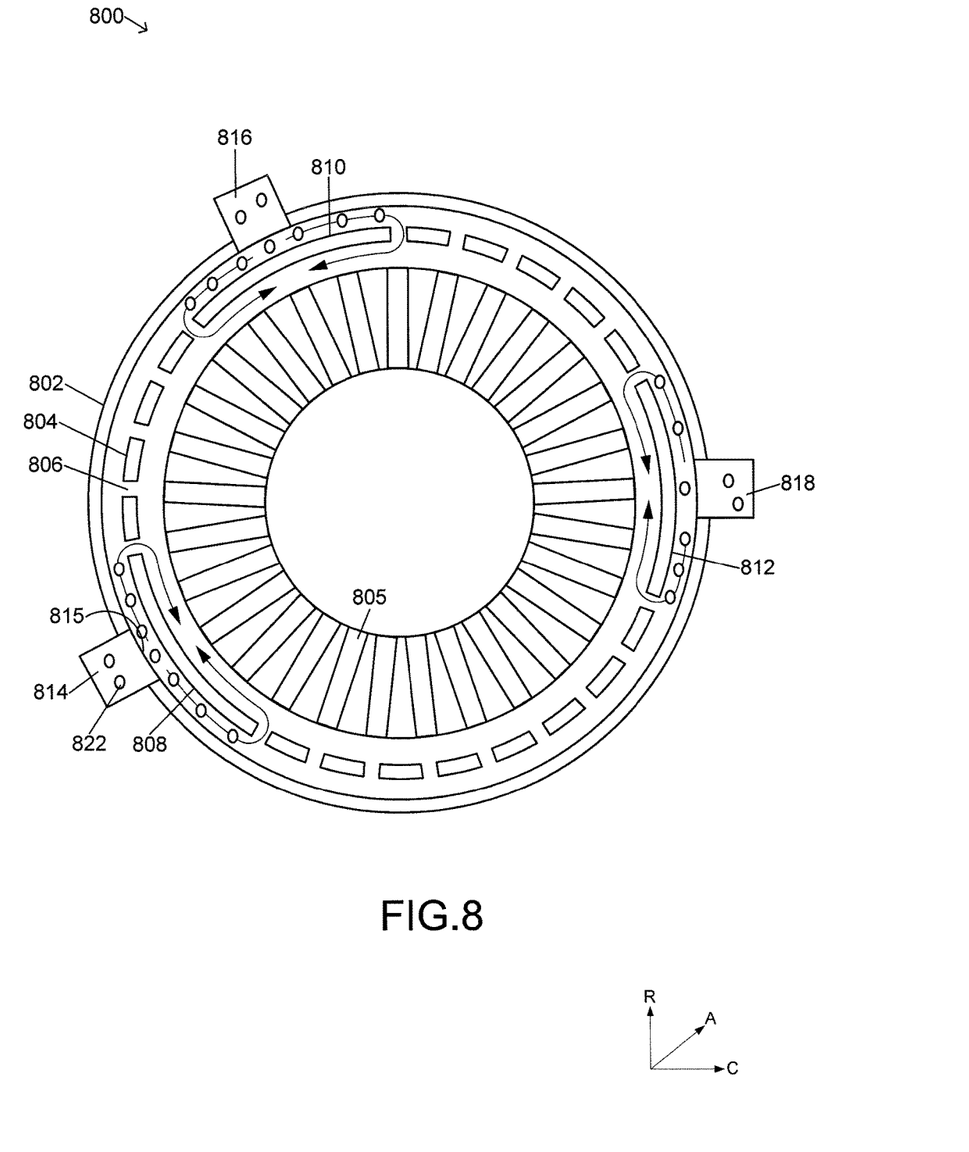
FIG. 8 is an axial view of a turbine section of a gas turbine engine with multiple debris distribution surfaces each aligned with a mouth of a TCA pipe, in accordance with various embodiments.

Turning to FIG. 8, an axial view of another turbine section 800 illustrates use of debris distribution surfaces in conjunction with TCA pipes. Turbine section 800 includes a casing 802, a vane support 804, a plurality of vanes 805 and a plurality of TCA pipes including a first TCA pipe 814, a second TCA pipe 816 and a third TCA pipe 818.

Cooling air may be pumped into turbine section 800 via TCA pipes 814, 816, 818. In that regard, the air received by turbine section 800 may include debris. Vanes 805 circumferentially aligned with TCA pipes may thus be subjected to more debris than vanes 805 not circumferentially aligned with TCA pipes.

In order to more evenly distribute debris 822, turbine section 800 includes a debris distribution surfaces circumferentially aligned with the TCA pipes. For example, a first debris distribution surface 808 is circumferentially aligned with a mouth 815 of first TCA pipe 814, a second debris distribution surface 810 is circumferentially aligned with second TCA pipe 816, and a third debris distribution surface 812 is circumferentially aligned with third TCA pipe 818.

None of the debris distribution surfaces 808, 810, 812 define radial apertures. In that regard, debris from TCA pipes 814, 816, 818 flows circumferentially around the debris distribution surfaces 808, 810, 812 and flow through component cooling channels 806 in order to reach the vanes 805. Thus, debris distribution surfaces 808, 810, 812 cause debris received via TCA pipes 814, 816, 818 to be more evenly distributed circumferentially about turbine section 800.

In various embodiments, first debris distribution surface 808 may include a portion of vane support 804 without component cooling channels. In various embodiments, first debris distribution surface 808 may include component cooling channels that have been filled in and/or covered to reduce or eliminate an amount of air that may flow therethrough. In various embodiments, first debris distribution surface 808 may be an extra surface coupled to casing 802, vane support 804 and/or vanes 805.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 u.s.c. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for circumferentially distributing debris in a gas turbine engine comprising:
   a plurality of vanes each having a vane cooling channel for receiving a cooling airflow;
   a casing at least partially enclosing the plurality of vanes; and
   a component positioned circumferentially about the plurality of vanes and radially between the plurality of vanes and the casing and having a first portion that defines a plurality of component cooling channels configured to receive the cooling airflow and a circumferentially continuous second portion that extends for at least 30 degrees about a circumference of the component,
   wherein a first diameter of a first component cooling channel of the plurality of component cooling channels is greater than a second diameter of a second component cooling channel of the plurality of component cooling channels and wherein the first component cooling channel is closer to the circumferentially continuous second portion than the second component cooling channel.

2. The system of claim 1, wherein the circumferentially continuous second portion extends for between 60 degrees and 180 degrees about a circumference of the gas turbine engine.

3. The system of claim 1, wherein the circumferentially continuous second portion includes an austenitic nickel-chromium-based alloy.

4. The system of claim 1, wherein the component consists of a vane support or a blade outer air seal (BOAS).

5. The system of claim 1, wherein the casing at least partially defines an upstream cooling channel configured to provide the cooling airflow to the plurality of component cooling channels.

6. The system of claim 1, wherein a circumferential center of the circumferentially continuous second portion is circumferentially aligned with a bottom of the gas turbine engine.

7. The system of claim 1, wherein the circumferentially continuous second portion defines a debris distribution surface of a vane support.

8. A system for circumferentially distributing debris in a gas turbine engine comprising:
   a plurality of vanes each having a vane cooling channel for receiving a cooling airflow;
   a casing at least partially enclosing the plurality of vanes; and
   a vane support positioned circumferentially about the plurality of vanes and radially between the plurality of vanes and the casing and having a first portion that defines a plurality of component cooling channels and a circumferentially continuous second portion that extends for at least 30 degrees about a circumference of the vane support,
   wherein a first diameter of a first component cooling channel of the plurality of component cooling channels is greater than a second diameter of a second component cooling channel of the plurality of component cooling channels and wherein the first component cooling channel is closer to the circumferentially continuous second portion than the second component cooling channel.

9. The system of claim 8, wherein the circumferentially continuous second portion extends for between 60 degrees and 180 degrees about the circumference of the vane support.

10. The system of claim 8, wherein the casing at least partially defines an upstream cooling channel configured to provide the cooling airflow to the vane cooling channel.

11. The system of claim 8, wherein a center of the circumferentially continuous second portion is aligned with a bottom of the gas turbine engine.

12. The system of claim 8, wherein each of the plurality of component cooling channels between the first component cooling channel and the second component cooling channel has a diameter that increases from the first component cooling channel to the second component cooling channel.

13. A system for circumferentially distributing debris in a gas turbine engine comprising:
   a plurality of vanes each having a vane cooling channel for receiving a cooling airflow;
   a casing at least partially enclosing the plurality of vanes;
   a component positioned circumferentially about the plurality of vanes and radially between the plurality of vanes and the casing and having a first portion that defines a plurality of component cooling channels configured to receive the cooling airflow and a circumferentially continuous second portion that extends for at least 30 degrees about a circumference of the component;
   a local turbine cooling air (TCA) pipe having a mouth configured to provide the cooling airflow to the plurality of component cooling channels; and
   wherein the circumferentially continuous second portion provides a debris distribution surface circumferentially aligned with the mouth of the TCA pipe and configured to distribute at least some debris flowing through the TCA pipe away from the plurality of component cooling channels,
   wherein a first diameter of a first component cooling channel of the plurality of component cooling channels is greater than a second diameter of a second component cooling channel of the plurality of component cooling channels and wherein the first component cooling channel is closer to the circumferentially continuous second portion than the second component cooling channel.

14. The system of claim 13, wherein the debris distribution surface includes an austenitic nickel-chromium-based alloy.

15. The system of claim 13, wherein the component consists of a vane support or a blade outer air seal (BOAS).

* * * * *